US012700022B2

(12) United States Patent
Pat et al.

(10) Patent No.: US 12,700,022 B2
(45) Date of Patent: Aug. 4, 2026

(54) SYSTEMS AND METHODS RELATING TO IMPLEMENTATION OF PREDICTIVE MODELS IN CONTACT CENTERS

(71) Applicant: GENESYS CLOUD SERVICES, INC., Menlo Park, CA (US)

(72) Inventors: Ankit Pat, Markham (CA); Julianne Madeleine Chaloux, Galway (IE); Stephen McConville, Galway (IE); Maciej Dabrowski, Galway (IE)

(73) Assignee: Genesys Cloud Services, Inc., Menlo Park, CA (US)

( * ) Notice: Subject to any disclaimer, the term of this patent is extended or adjusted under 35 U.S.C. 154(b) by 490 days.

(21) Appl. No.: 18/084,694

(22) Filed: Dec. 20, 2022

(65) Prior Publication Data

US 2024/0202783 A1 Jun. 20, 2024

(51) Int. Cl.
*G06Q 30/02* (2023.01)
*G06F 18/2321* (2023.01)

(52) U.S. Cl.
CPC ..... *G06Q 30/0281* (2013.01); *G06F 18/2321* (2023.01)

(58) Field of Classification Search
None
See application file for complete search history.

(56) References Cited

U.S. PATENT DOCUMENTS 9,723,151 B2 8/2017 McGann et al.
2012/0020471 A1* 1/2012 Erhart ................. H04M 3/5232 379/265.1
2012/0087486 A1* 4/2012 Guerrero .......... G06Q 10/06311 703/6

(Continued)

FOREIGN PATENT DOCUMENTS

WO WO 2019158927 * 2/2019 ............... G10H 7/00

OTHER PUBLICATIONS

Search Report and Written Opinion received for co-pending PCT application having application No. PCT/US2023/082563 received May 2, 2024.

(Continued)

*Primary Examiner* — Kiersten V Summers
(74) *Attorney, Agent, or Firm* — Taft Stettinius & Hollister LLP

(57) ABSTRACT

A method for operationally transitioning between a first and second model in a contact center. The method includes defining a transition window and a pre-transition window. The method includes, during the pre-transition window, using the first model to determine first outputs and, therefrom, determining first output probability distributions and using, in real-time, the first outputs operationally in relation to pre-transition customers. The method includes, during the transition window: using the second model to determine second outputs, and, therefrom, determining second output probability distributions; determining a target output probability distribution; transforming a current second output probability distribution into the target output probability distribution and, based on the transformation, determining a transformed output for the second outputs of the current second output probability distribution; and using, in real-time, the transformed outputs operationally in relation to the transition customers.

17 Claims, 4 Drawing Sheets

400

(56) References Cited

U.S. PATENT DOCUMENTS

| | | | | |
|---|---|---|---|---|
| 2014/0365314 | A1* | 12/2014 | Torrens | G06Q 30/0269 705/14.66 |
| 2015/0281448 | A1* | 10/2015 | Putra | G06Q 10/0633 379/265.03 |
| 2016/0162913 | A1* | 6/2016 | Linden | G06Q 30/0202 705/7.31 |
| 2017/0111507 | A1* | 4/2017 | McGann | H04M 3/5233 |
| 2019/0102807 | A1* | 4/2019 | Pham | G06Q 30/0275 |
| 2019/0362238 | A1* | 11/2019 | Pietquin | G06N 3/044 |
| 2023/0368774 | A1* | 11/2023 | Davis | G06F 1/03 |

OTHER PUBLICATIONS

"Inverse transform sampling—Wikipedia", Oct. 10, 2022, XP093149530, Retrieved from the Internet: https://en.wikipedia.org/w/index.php?title=Inverse_transform_sampling&oldid=1115190568.

* cited by examiner

300

Pre-Transition Window ⎯310

| | Day 1 | Day 2 | Day 3 | Day 4 | Day 5 |
|---|---|---|---|---|---|
| Model 1.0 Output | 1 | 2 | 3 | 4 | 5 |
| Model 2.0 Output | | | | | |
| Private Output | 1 | 2 | 3 | 4 | 5 |
| Public Output | 1 | 2 | 3 | 4 | 5 |

Transition Window ⎯305

| | Day 6 | Day 7 | Day 8 | Day 9 | Day 10 |
|---|---|---|---|---|---|
| Model 1.0 Output | | | | | |
| Model 2.0 Output | 6' | 7' | 8' | 9' | 10' |
| Private Output | 6' | 7' | 8' | 9' | 10' |
| Public Output | $xf(1\text{-}5) * 6'$ | $xf(2\text{-}5, 6') * 7'$ | $xf(3\text{-}5, 6', 7') * 8'$ | $xf(4\text{-}5, 6'\text{-}8') * 9'$ | $xf(5, 6'\text{-}9') * 10'$ |

400

405
Determining a transition window and pre-transition window for completing the transition.

410
Using, during the pre-transition window, the first model to determine first outputs, which are used operationally in relation to respective pre-transition customers, and, from the first outputs, determining first output probability distributions.

415
Using, during the transition window, the second model to determine second outputs in relation to respective transition customers, and, from the second outputs, determining second output probability distributions.

420
Determining a target output probability distribution.

425
Transforming the current second output probability distribution into the target output probability distribution and, based on the transformation, determining a transformed output for each of the second outputs contained in the current second output probability distribution.

430
Using, in real-time, the transformed outputs operationally in relation to the transition customers.

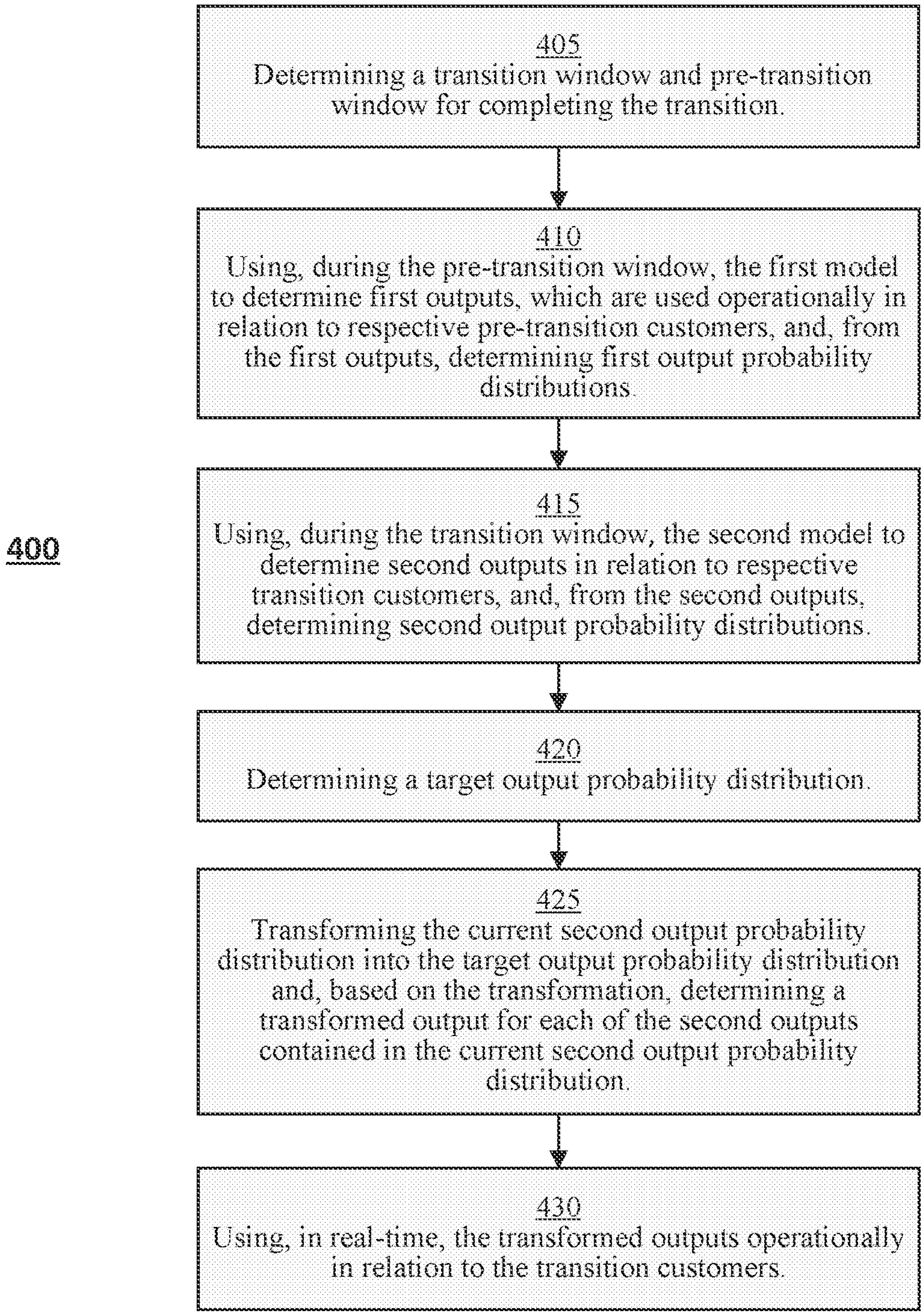

FIG. 4

SYSTEMS AND METHODS RELATING TO IMPLEMENTATION OF PREDICTIVE MODELS IN CONTACT CENTERS

BACKGROUND

The present invention generally relates to the field of contact centers and customer relations management. More particularly, but not by way of limitation, the present invention pertains to assisting customers via automated service options, including ways for improving how predictive analytics and machine learning models are implemented in contact centers.

BRIEF DESCRIPTION OF THE INVENTION

The present invention includes a method for facilitating an operational transition between a first model and a second model in a contact center. The first model and second model each may be a predictive model for calculating an output related to a customer interacting with the contact center. The method may include the steps of: identifying the first model and the second model; defining a transition window that is a predetermined timeframe for operationally transitioning between the first model and the second model; and defining a pre-transition window that is a predetermined timeframe occurring just previous to the transition window. The method may further include the steps of, during the pre-transition window: using the first model to determine first outputs in relation to respective pre-transition customers, which are ones of the customers interacting with the contact center during the pre-transition window, and, from the first outputs, determining first output probability distributions; using, in real-time, the first outputs operationally in relation to the pre-transition customers. The method may further include the steps of, during the transition window: using the second model to determine second outputs in relation to respective transition customers, which are ones of the customers interacting with the contact center during the transition window, and, from the second outputs, determining second output probability distributions; determining a target output probability distribution; transforming a current one of the second output probability distributions into the target output probability distribution and, based on the transformation, determining a transformed output for each of the second outputs contained in the current one of the second output probability distributions; and using, in real-time, the transformed outputs operationally in relation to the transition customers. The target output probability distribution may be calculated as a mean output probability distribution derived from: one or more of the first probability output distributions; and one or more of the second output probability distributions.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

FIG. 4 is a method of model transitioning in accordance with an embodiment of the present invention.

DETAILED DESCRIPTION

Figure 1:
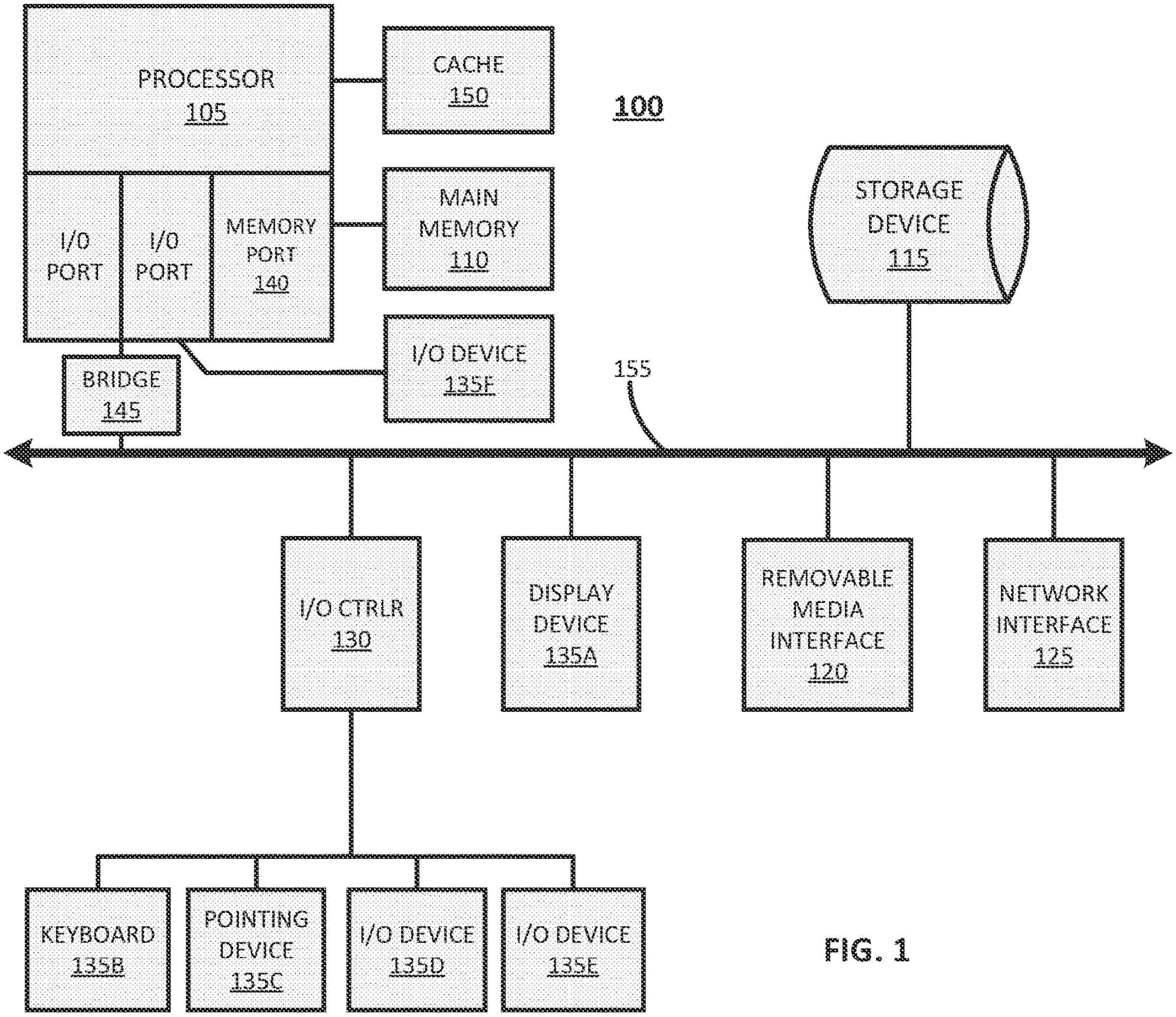
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure, or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Figure 2:
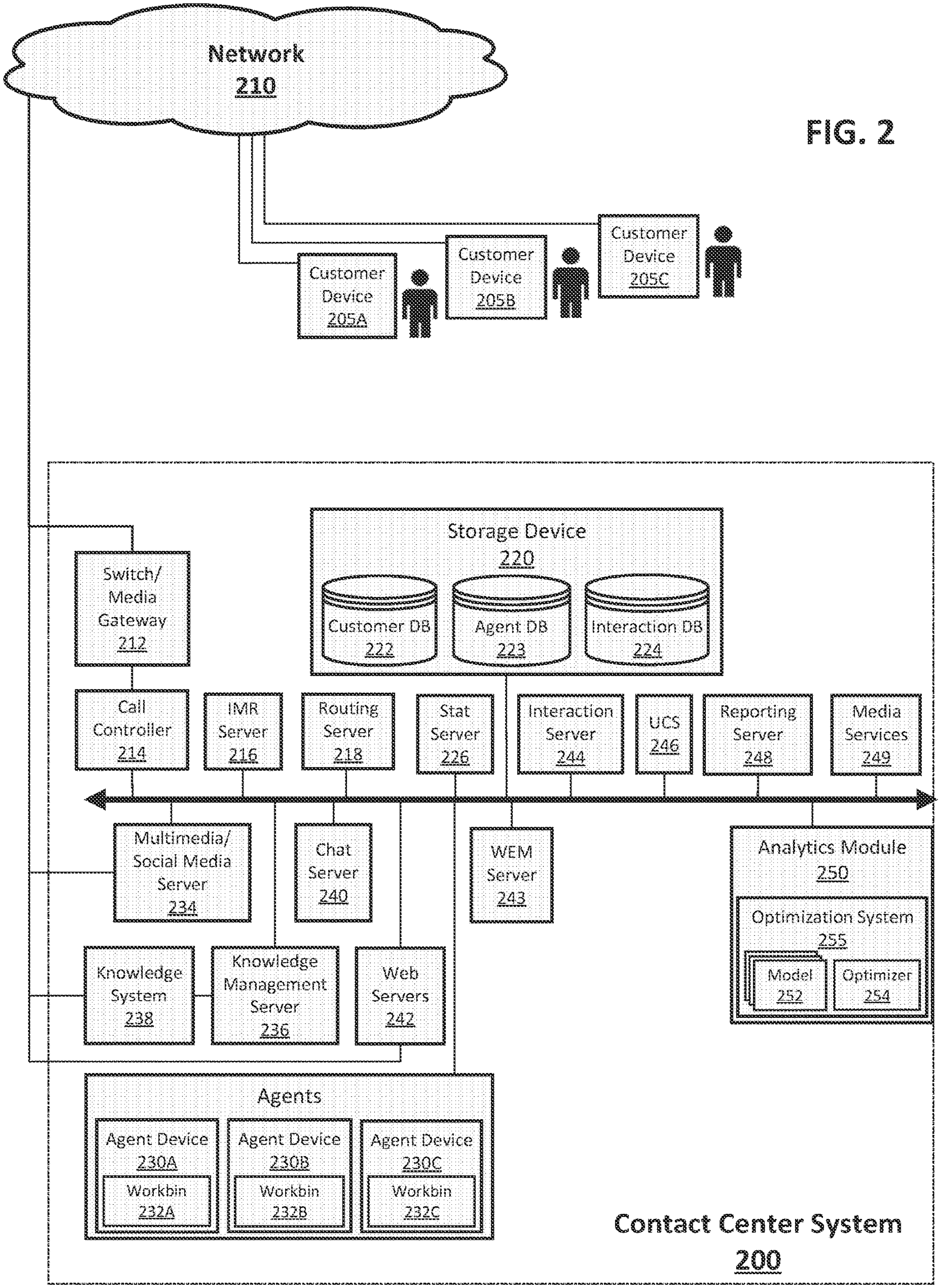
FIG. 2 depicts a schematic block diagram of a communications infrastructure or contact center in accordance with exemplary embodiments of the present invention and/or with which exemplary embodiments of the present invention may be enabled or practiced.

Before proceeding with a detailed description of the present invention, an exemplary computing device and contact center system will be discussed in relation to FIGS. 1 and 2, respectively. As will be understood by one of ordinary skill in the art, the computing device and contact center system are provided as an exemplary environment in which aspects of the present disclosure could be readily implemented, though it should be understood that the methods and systems disclosed herein may not limited to such use unless expressly stated herein. Accordingly, the following description related to FIGS. 1 and 2 is meant to provide general discussion regarding enabling technology as well as background information on contact center systems and the operation thereof. Discussion specifically related to the present invention will continue with reference to FIG. 3, where the manner of its implementation and operation in similar and analogous environments will be provided.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit or processor 105 and a main memory 110. The computing device 100 may also include a storage device 115, removable media interface 120, network interface 125, input/output controller 130, and one or more input/output devices 135, which as depicted may include an, display device 135A, keyboard 135B, and pointing device 135C. The computing device 100 further may include additional elements, such as a memory port 140, a bridge 145, input/output ports, one or more additional input/output devices 135D, 135E, 135F, and a cache memory 150 in communication with the processor 105.

The processor 105 may be any logic circuitry that processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of input/output devices 135, one or more of which may be connected via the input/output controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the input/output devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network ("PSTN"), wireless carrier network, local area network, private wide area network, public wide area network, such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized.

Contact Center

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" may be used herein to refer to the system depicted in FIG. 2 and/or the components thereof, while the term "contact center" may be used more generally to refer to a customer service provider (such as a particular customer service provider providing customer services through the contact center system 200), and/or the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing costs and/or maximizing efficiency. Contact centers may include many different systems and modules—such as those shown in exemplary contact center system 200—in furtherance of this aim. The contact center system 200 may engage and manage interactions in which automated processes (or bots) or human agents communicate with customers. As should be understood, the contact center system 200 may be an in-house facility to a business or enterprise for performing the functions of sales and customer service. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response ("IMR") server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; workforce engagement management ("WEM") server 243; interaction server 244; universal contact server (or "UCS") 246; reporting server 248; media services server 249; and an analytics module 250. Any of the computer-implemented components, modules, or servers described in relation to FIG. 2 or in any of the following figures may be implemented via any type of computing devices, including the example computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network, local area network, private wide area network, and/or public wide area network, such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange ("PBX"), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration software for interfacing with the switch/media gateway and other components. The call controller 214 may include a session initiation protocol ("SIP") server for processing SIP calls. The call controller 214 may also extract data about an incoming interaction, such as the customer's telephone number, IP address, or email address, and then communicate these with other contact center components in processing the interaction.

In regard to the interactive media response ("IMR") server 216, it may be configured to enable self-help or virtual assistant functionality. Specifically, the IMR server 216 may be similar to an interactive voice response ("IVR") server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement, and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the WEM server 243, it may be configured to host and enable a suite of features focused on improving employee engagement in contact centers, which may be referred to broadly as "workforce engagement management" (or "WEM"). The WEM server 243 may provide solutions that simplify the agent experience and help drive results and employee satisfaction. The WEM server 243 may include capabilities such as call recording, screen recording, quality management, performance management, speech and text analytics, gamification, as well as capabilities related to workforce management (or "WFM") and workforce optimization ("WFO"). In general, WFM makes sure that the right resource is there at the right time for service, while WFO provides the ability to monitor and act upon the content of the interactions via quality management and interaction analytics. In addition to those functions, WEM further ensures that the prerequisites for enabling the contact center to provide effective customer service over the long-term by engaging the agents who provide the service. In doing this, the WEM server 243 may provide functionality aimed at allowing contact centers to improve metrics related to employee recognition, churn, and development. Further, WEM recognizes a shift within the contact center industry from focusing on optimizing labor productivity and managing labor costs—i.e., workforce optimization—to a more employee-centric focus that engages agents throughout the employment life cycle. WEM applications are designed to increase agent engagement by automating tasks associated with scheduling, coaching, quality management, performance management and more. More specifically, the WEM server 243 may include core applications such as recording interactions across all channels, quality monitoring with automated scoring, workforce management with AI-infused scheduling and forecasting, performance management, speech and data analytics, and others. The WEM server 243 may further provide features such as gamification, robotic process automation, voice authentication, predictive analytics, chatbots, customer engagement hub, tools for building custom applications, and AI and analytics. For example, AI-infused algorithms can prepare more accurate agent schedules, customer insights, routing, etc., which consider more variables and have greater predictive power. Further, much of the tedious labor involved in quality monitoring can be automated, which saves time and money and improves agent morale. Other functionality may include any of the related features described herein as would be understood and enabled by one of ordinary skill in the art. Such enablement may include connections with any of the other servers, devices and data sources described herein.

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server ("UCS") 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server (or "media server") 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like. The media server 249 may store media content locally. In other embodiments, such as those discussed below in relation to FIGS. 4-5, the media server 249 may augment such functionality by orchestrating the remote storage of media files on agent devices and sharing of those media files between agent devices to achieve desired functionality.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network or deep learning approach is presently a preferred embodiment for implementing the models 252. Such models, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2—as well as those of the other figures included herein—may each include one or more processors executing computer program instructions and interacting with other system components for performing the various functionalities described herein. Such computer program instructions may be stored in a memory implemented using a standard memory device. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces (UIs) that may be generated on the customer devices 205 and/or the agent devices 230.

Figure 3:
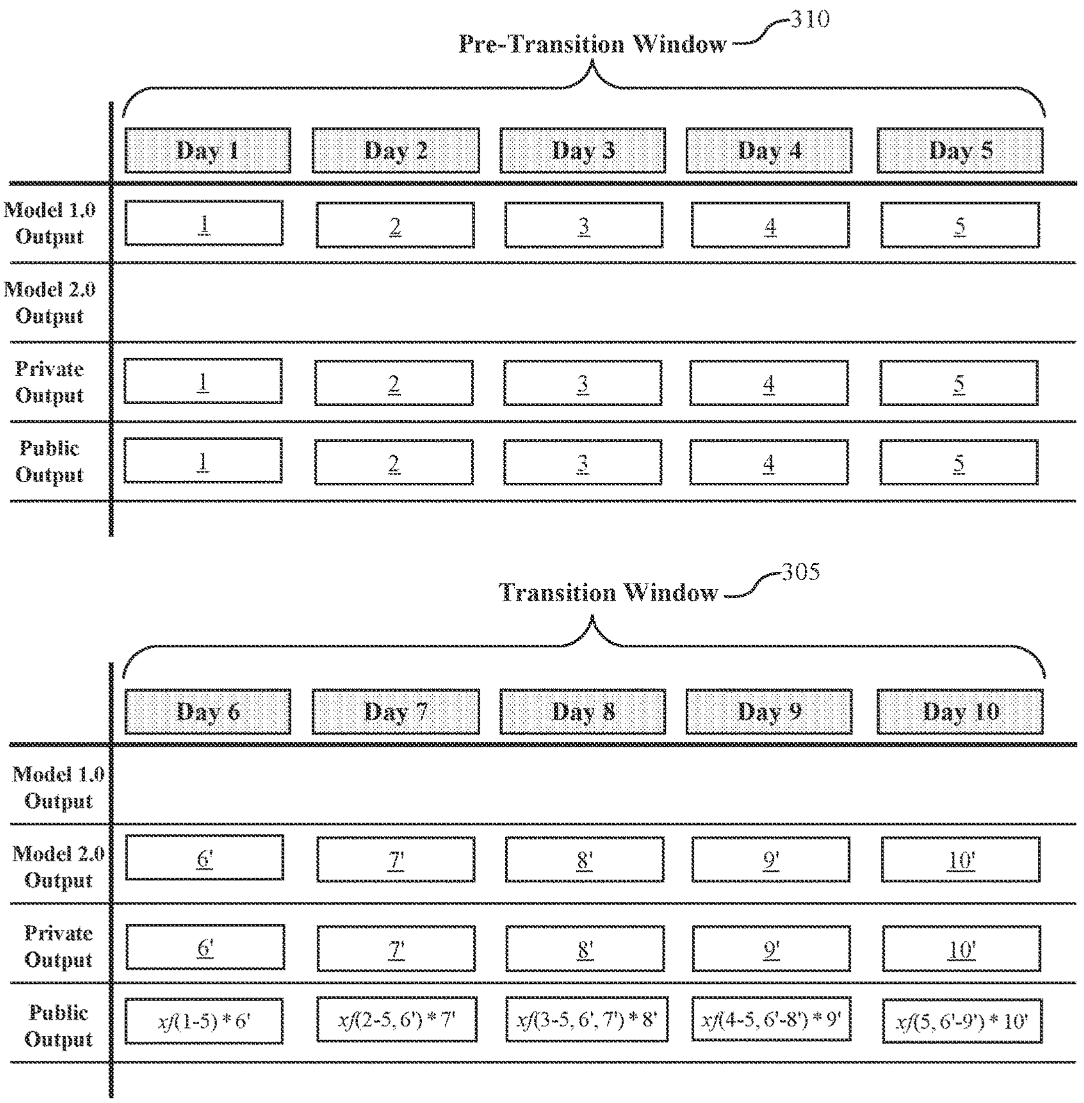
FIG. 3 is chart illustrating a method of model transitioning according to an embodiment of the present application.

Turning now to FIGS. 3-4, the functionality and operation associated with the present will now be discussed in accordance with example embodiments. Before proceeding with this, though, some background as to how a contact center functions will be provided while also highlighting some example operational shortcomings of conventional centralized media systems that the present invention is intended to address.

Contact centers generally employ many types of predictive models to anticipate customer behavior and, thereby, create proactive ways to better serve customers with automated services. Such models, which may be predicated on machine learning or neural networks, generally include configuring action thresholds on output probability distributions. An action threshold, for example, provides a demarcation between action and inaction in relation to a prediction about a customer. In this way, the action threshold provides a recommendation as to whether a particular automated action should be taken in a given situation. As an example, outputs of a given model that do not satisfy the applicable action threshold are interpreted as instances when taking a particular action is undesirable, while outputs that do satisfy the action threshold are interpreted as instances when taking the particular action is desirable. One type of predictive model is used to recommend which customers should be offered a chat with a human agent based on behavior exhibited by the customers. The behavior may be how a customer is interacting with the webpage of a business. For example, whether to offer the chat may be selectively based on a prediction that the customer is at least 80% likely to accept the chat or a sales offer made during the chat. As another example, agent support for a customer may be triggered when the likelihood of customer needing such support is above 60%. Such action thresholds are typically based on an existing trained model and a desired performance level related to a particular operational KPI or metric of the contact center. Thus, chat support may be offered to customers who are 80% likely to accept because that threshold leads to a given number of customers accepting, with that number being tied to a desirable level or result, such as, for example, a commiserate number of agents to handle that number of chats or a compliance metric in relation to an applicable service level agreement.

Over time the performance of such predictive models generally deteriorates. There are many reasons for deterioration of model performance, including data drift, concept drift, etc. Modern machine learning models attempt to combat these challenges by automation of model lifecycle with either online model learning or batch retraining, with such retraining being reactive to model metrics or at preset intervals. As will be appreciated, the model retraining process typically results in new machine learning model, which may be referred to as a new model, replacement model, or a "Model 2.0", that produces an output probability distribution that is different from the model it is meant to replace, which may be referred to as a prior model or "Model 1.0". In the above example, where action thresholds are set, the substitution of Model 2.0 for Model 1.0 will lead to changes in metric or KPI performance. For example, more or less chats may be offered based on the "80% likely to accept" chat rule if the Model 2.0 distribution skews towards a higher or lower probability range, respectively.

As another example, consider the case of a predictive model that models interactions of customers with an automated resource (e.g., a chatbot) and predicts when such interactions should be escalated to a human resource or agent. Such escalations may become necessary for several reasons, including preventing customer frustration, taking advantage of a likely sales opportunity, identification of a nuanced issue that requires human care, etc. With such a model, the transition to a new model may result in many more or many less escalations, which can impact contact center ability to provide customer care in a cost-effective manner. This is true even when the relevant action threshold is adjusted. In the case of too many escalations, the agents available to help those customers could be overwhelmed and customer wait times could increase significantly. In the case of not enough escalations, the agents working a particular shift could be underutilized and opportunities with certain customer missed.

Accordingly, it should be appreciated that transitioning between models can be difficult to manage effectively, as the output probability distribution of the new model typically renders different results than the one of the prior model. Because of this, it is often necessary to manually modify action thresholds to prevent jumpy transitions in operation metrics associated with the model, as such sudden change can negatively impact contact center performance. However, this type of solution is too often inexact and inefficient. Another possible solution to the problem is the use of pacing algorithms, which can be used to preserve the level of various metrics. As an example, a pacing algorithm may "pause" recommending chats to customers based on the system becoming overloaded with the number of previous recommendations. As will be appreciated, pauses of this type come at the cost of suppressing analytics as to the value of customers and result in missed opportunities. A more desirable way to manage such model transitions is needed. Additionally, to the extent that such a solution could also be used to control model drift, it would be further applicable.

In the present application, methods and systems are proposed to manage model transitions so as to smooth the transition process in a desirable way. Present methods and systems may also be used as a control mechanism to address model drift and similar issues. In accordance with exemplary embodiments, model transition may be desirably achieved without the need to change action thresholds, which reduces the complexity of the transition as well as the need for human intervention. Further, as will be seen, the approach of the present application can be used to convert values from any general starting probability distribution output to a desired target probability distribution, which may be used in model transitions as well as a control mechanism. These objectives may be achieved in several specific ways, each of which will now be explained with reference to exemplary embodiments. As will be seen, the exemplary embodiments provide alternatives applicable to several different scenarios, including ways to convert an output distribution to a desired target distribution, ways to define a preferable target distribution, and preferred approaches for applying those concepts for smoothing a transition between two different models over a defined transition window.

In accordance with an exemplary embodiment, one approach includes converting or mapping the model's output probability distribution to a fixed or static target probability distribution. Thus, for example, the output probability distribution of a new model may be converted or mapped to a static target probability distribution. The static target distribution may be selected in accordance with a preferred probability distribution or a probability distribution for a model from previous operation, for example, before data drift occurred. With this type of operation, embodiments of the present application may provide a control mechanism when transitioning to a new model or managing changes in model performance due to drift. As described more below, since the new output distribution is mapped or converted to the target distribution using an inverse transformation method, the rank of prediction probabilities after transformation is preserved, i.e., if p(x)>p(y) in the first distribution, then after transformation, p(x)>p(y) is preserved. As will be appreciated, in such cases, it is possible to maintain an action threshold (e.g., select the top N % of predictions for taking the prescribed action) while also maintaining desired metric or KPI performance. Further, more nuanced targeting of predictions can be done using multi-modal static distributions.

More specifically, in accordance with exemplary embodiments, it is proposed that the mapping or transformation of the output distribution to a target distribution be achieved via inverse transformation sampling. As will be appreciated, inverse transform sampling (also known as inversion sampling, the inverse probability integral transform, or the inverse transformation method) is a method for pseudo-random number sampling, i.e., for generating sample numbers at random from any probability distribution given its cumulative distribution function. In the context of the present invention, this process may be performed in the following way. As a first step, the probability density function (or "PDF") of the starting distribution (or "$PDF_1$") and that of the target distribution ("$PDF_2$") is calculated. In probability theory, a probability density function, or density of a continuous random variable, is a function whose value at any given sample (or point) in the sample space (the set of possible values taken by the random variable) can be interpreted as providing a relative likelihood that the value of the random variable would be close to that sample. In a more precise sense, the PDF is used to specify the probability of the random variable falling within a particular range of values, as opposed to taking on any one value. This probability is given by the integral of this variable's PDF over that range—that is, it is given by the area under the density function but above the horizontal axis and between the lowest and greatest values of the range. Next, as a second step, the cumulative distribution function (or "CDF") is calculated for the starting distribution (or "$CDF_1$") and that of the target distribution (or "$CDF_2$"). In probability theory, the cumulative distribution function describes the probability that a random variable (x) with a given probability distribution will be found at a value less than or equal to (x). Next, as a third step, an inversion of $CDF_2$ (or "INV-$CDF_2$") is taken. Next, as a fourth step, for a given observation $p_1$ from $PDF_1$, the transformation:

$$\text{INV-}CDF_2(CDF_1(p_1))$$

is applied. Thus, for a given observation ($p_1$) from $PDF_1$, $$(p_2) = \text{INV-}CDF_2(CDF_1(p_1))$$

The collection of ($p_2$) determined from each given observations ($p_1$) yields $PDF_2$. As will be appreciated, this transformation may not be possible for all distributions while using closed-form distribution equations, as $CDF_2$ may not always be invertible. However, computationally, it is always possible to invert $CDF_2$. Because the proposed methods of the present application are computational, the above algorithm is generally applicable. This transformation may be implemented with a static target distribution or a target distribution that is determined via the output of the model being replaced. The latter situation will now be explained with reference to an exemplary embodiment in which an existing model is replaced with a newer version.

With reference now to a chart 300 of FIG. 3, an exemplary embodiment is described in relation to a proposed implementation of the present invention involving a transition between two versions of a model. The existing or prior model is referenced as "Model 1.0" and the replacement is referenced as "Model 2.0". To provide further context, both Model 1.0 and Model 2.0 may be predictive models and may be based on machine learning or deep learning. Both models may be retrained and a regular basis during operation, for example, daily. It should be appreciated that the present method may also be employed with other types of models in a similar way.

As indicated, the chart 300 of FIG. 3 depicts a 10-day period of sequentially occurring days, and within this period, outputs derived from Model 1.0 and Model 2.0 are provided. In accordance with the present invention, the chart 300 also depicts a manner in which a transition between two models may be achieved, which has been found to be preferable in the way contact center KPIs and metrics are maintained during the transitions. The actual transition occurs over a 5-day transition window 305, which is latter half of the 10-day period, while the initial 5-day window constitutes a pre-transition window 310. The length of the transition window may be a predetermined number of cyclical time-frame units that are relevant to the models, for example, days, work shifts, etc. Though the transition window may be any length, for the sake of the example, the transition window 305 is a 5-day period. In exemplary embodiments, for reasons that will become apparent in the description below, the number of days in the transition window may be equivalent to the number of the days in the pre-transition window. As will be seen, during the transition window, the present invention applies a correction to the output of Model 2.0 so to smooth the output it provides with those outputs provided previously with Model 1.0. In exemplary embodiments, this correction is based on the previous output distributions during a lookback period extending into the pre-transition window. More specifically, the output of the system during the transition window is a particularly calculated combination of both Model 1.0 and Model 2.0, as it is a function of both: a) the current output distribution of the replacement model (i.e., Model 2.0); and b) output distributions produced previously during the lookback period, which, as will be seen, includes one or more output distributions from the prior model (i.e., Model 1.0) made during the pre-transition window.

The chart 300 also introduces a few other terms that need some explanation. The terms "private output" and "public output" are used to classify model outputs that the system uses during the 5-day period to make the transition. As used herein, the "public output" is an output that is actually used by the system operationally, for example, to make operational predictions about customers that affect how they are served. Thus, the public output also may be referred to as the "system output". As used herein, the "private output" constitutes a model output that is used in calculating the "public output" during the transition window. As shown, before the pre-transition window—i.e., during the first half of the 10-day period—the output of the system or public output is simply the output of Model 1.0. Further, during the pre-transition window, the private output is also the output of the Model 1.0, as this output is recorded for use in calculating the public output during the transition window.

Accordingly, during the pre-transition window, Model 1.0 is the operational model and the system operates per its output. On Day 6, this changes as the transition window begins. At this point, Model 2.0 begins producing an output, while Model 1.0 ceases to operate. In accordance with the exemplary embodiment depicted in the chart 300, the manner in which the transition between the two models is smoothed centers around how the system or public output is determined during the transition window. During the transition window, the output of Model 2.0 is not directly used as the operational output, but instead classified as a private output that is used to derive the public output. That is, the public output during the transition window is derived from private outputs produced by Model 1.0 and Model 2.0. In an exemplary embodiment, as depicted in FIG. 3, the public output is based on a current output probability distribution of the Model 2.0 that is then transformed according to a target output probability distribution. The target output probability distribution is based on the output probability distributions recorded during a lookback period. As used herein, the "lookback period" constitutes a predetermined number of days preceding a current day. As such, the lookback period progress in relation to the current day, while also being defined so to always extend at least some into the pre-transition window so that one or more outputs from the Model 1.0 are included in the derivation of the target output probability distribution. In this way—as depicted in the chart 300—the lookback period includes an increasing number of days within the transition window and a decreasing number of days in the pre-transition window as the current day progresses through the transition window. This arrangement provides a lessening influence of the outputs of Model 1 over the derivation of the target output probability distribution, and conversely, an increasing influence of the outputs of Model 2 over the same.

The target output probability distribution may be derived via a mathematical operation for summarizing a given group of data to reflect overall value and/or central tendency. In example embodiments, the target output probability distribution is a mean or average, weighted or otherwise, of the output probability distributions recorded for each of the days within the lookback period.

With specific reference to Day 6 of the chart 300, the system or public output is derived from two output probability distributions. The first of these two output probability distributions is the target output probability distribution. Because the target output probability distribution is derived from the lookback period, it may be simpler to refer to it simply as the "lookback period output probability distribution". That is, as explained above, the lookback period output distribution is an output distribution derived from output distributions produced during the lookback period, for example, the mean or average thereof. With the lookback period in the example being defined as the previous 5 days, the relevant lookback period for Days 6 is Days 1-5, which results in the lookback output distribution including only output distributions produced by the Model 1.0. The second of the two output distributions from which the public output of Day 6 is derived is the current output probability distribution. The current output probability distribution is simply the output distribution produced on the given current day within the transition window. For Day 6, of course, this is the output probability distribution produced by the Model 2.0 on Day 6.

The same formulation carries forward for Days 7-10. For each additional day in the series, the lookback period advances a day forward so that the lookback period output distribution is increasingly made up of days falling within the transition window, which means that the target output probability distribution is increasingly derived from outputs from the Model 2.0. For example, on the final day, Day 10, the lookback period includes Days 5-9, which results in the lookback period output distribution being derived from one day (Day 5) in which the output is produced by the Model 1.0 and four days (Days 6-9) in which the outputs are produced by the Model 2.0. After Day 10, the transition is complete such that on Day 11, which may be referred to as a post-transition period, the system output depends entirely on the Model 2.0. Of course, during the transition, operations may be closely monitored to understand how Model 2.0 is affecting overall performance. If the transition is proceeding in an undesirable way, the transition window could be extended, the transition process could be restarted or repeated, the Model 1.0 could be brought back on-line, the Model 2.0 could be revised, and/or some other suitable action could be taken. Note that the transition process illustrated in the chart 300 may be used for any type of model. Further, the process for transitioning from Model 2.0 to another model, e.g., "Model 3.0", would be the same, as would the inverse transition, i.e., transitioning from Model 2.0 to Model 1.0.

In preferred embodiments, the manner in which the public output for Days 6-10 is derived from the two identified output probability distributions involves the transformation function discussed above. As described above, this involves the transformation of an output distribution to a target distribution via inverse transformation sampling. In relation the process of the chart 300 of FIG. 3, the "current output distribution" becomes the output distribution, and the "lookback period output distribution" becomes the target output distribution to which it is mapped. With this in mind, for Day 6, the current output distribution for the Model 2.0 for Day 6 is transformed via inverse transformation sampling into the lookback period output distribution (which is derived from the output distributions from Days 1-5). This transformation is abbreviated in the chart 300 as: xf(1-5)*6'. For Day 7, the current output distribution for the Model 2.0 for Day 7 is transformed via inverse transformation sampling into the lookback period output distribution (which is derived from the output distributions from Days 2-6). This transformation is abbreviated in the chart 300 as: xf(2-5, 6')*7'. This process is continued through Days 8-10. As provided in the chart 300, the transformation for Day 8 is abbreviated as: xf(3-5, 6', 7')*8'. The transformation for Day 9 is abbreviated as: xf(4-5, 6'-8')*9'. And, finally, the transformation for Day 10 is abbreviated as: xf(5, 6'-9')*10'.

With reference now to FIG. 4, a method 400 is presented that describes selected aspects of the above disclosure in an alternative manner, including the introduction of certain terminology selected to define both generalized and specific embodiment. The method 400 may be used to facilitate an operational transition between a first model to a second model in a contact center. In embodiments, the first model and second model each may be a predictive model for calculating an output related to a customer interacting with the contact center. As an example, the first and second models may be different versions of the same machine learning model, with the second model being a replacement version of the first model, for example, a version that is trained on a different dataset, retrained by a more current training dataset, or configured differently. In embodiments, the output of the first and second models may indicate a likelihood of a desired outcome occurring in relation to the customer based on behavior data associated with the customer. Further, in embodiments, the output may be scored in relation to a predetermined action threshold for selectively determining whether to perform an automated action in relation to the customer for achieving the desired outcome. In such cases, the automated action may be taken when the output satisfies the action threshold and not taken when the output does not satisfy the action threshold.

The method 400 may begin at step 405 in which a transition window is defined. As used therein, the transition window is a predetermined timeframe for operationally transitioning between the first model and the second model. As part of this step, a pre-transition window may also be defined. The pre-transition window is a predetermined timeframe occurring just previous to the transition window. The method 400 may then proceed to step 410.

At step 410, the method 400 may include using, during the pre-transition window, the first model to determine first outputs in relation to respective pre-transition customers. As used herein, pre-transition customers are the customers interacting with the contact center during the pre-transition window. From the first outputs, the step 410 may further include determining first output probability distributions. Additionally, as will be appreciated, during the pre-transition window, the first outputs may be used operationally, in real-time, in relation to the pre-transition customers. The method 400 may then proceed to step 415.

At step 415, the method 400 may include using, during the transition window, the second model to determine second outputs in relation to respective transition customers. As used herein, transition customers are the customers interacting with the contact center during the transition window. From the second outputs, the step 415 may further include determining second output probability distributions. The method 400 may then proceed to step 420.

At step 420, the method 400 may include determining a target output probability distribution. The method 400 may then proceed to step 425.

At step 425, the method 400 may include transforming a current one of the second output probability distributions (or "current second output probability distribution") into the target output probability distribution and, based on the transformation, determining a transformed output for each of the second outputs contained in the current second output probability distribution. The method 400 may then proceed to step 430.

At step 430, the method 400 may include using, in real-time, the transformed outputs operationally in relation to the transition customers.

In relation to the method 400, several alternative embodiments are disclosed herein as to how the target output probability distribution may be determined. In an embodiment, the target output probability distribution is calculated as a mean output probability distribution that is derived from one or more of the first probability output distributions and one or more of the second output probability distributions. In such cases, the one or more second output probability distributions that are used in the mean calculation may include the current second output probability distribution. In embodiments, the mean output probability distribution may be calculated as a weighted one. In such cases, the weighting may increasingly emphasize the importance of the one or more second output probability distributions over the importance of the one or more first probability output distributions as the transition window transpires.

In accordance with an exemplary embodiment, this weighting may be accomplished through the use of a sliding window, which is referred to above as a "lookback period". In such cases, the pre-transition window and the transition window are defined so that each includes a whole number of sequential and recurring operating intervals. Though other types of intervals may be used where more appropriate, in the above example, the operating intervals are each defined as a day. The operation of the lookback period is summarized above in relation to FIG. 3. In short, the lookback period may be a sliding window of a predetermined number of the operating intervals measured from and occurring just prior to a current operating interval. With the operating intervals defined, it will be appreciated that the multiple first probability output distributions produced by the first model may correspond to respective ones of the operating intervals (i.e., the operating intervals that make up the pre-transition window). Likewise, the multiple second output probability distributions produced by the second model correspond to respective ones of the operating intervals (i.e., the operating intervals that make up the transition window). Accordingly, the transition window transpires, operation of the lookback period results in the mean output probability distribution being derived from an increasing number of the second probability output distributions and, necessarily, a decreasing number of the first probability output distributions. This, of course, results from the differing operating intervals being captured within the lookback period as the lookback period advances in relation to the current operating intervals as the process moves through the transition window. That is, as the current operating interval approaches the end of the transition window, the operating intervals it captures in the pre-transition window necessarily decreases, while the operating intervals it captures in the transition window does the opposite.

In relation to the method 400, several alternative embodiments are disclosed herein as to how the transformation may be done. In embodiments, the transforming the current one of the second output probability distributions into the target output probability distribution may include mapping the current one of the second output probability distributions to a target output probability distribution so that the rank of output probabilities is preserved. In embodiments, the transforming the current one of the second output probability distributions into the target output probability distribution may be completed using inverse transform sampling.

In alternative embodiments, the method 400 may further include steps after the transition window has close. For example, the method 400 may include determining that this has occurred, i.e., that the timeframe of the transition window has ended. With the transition window over, the transition to the second model may be considered completed. In such cases, the method 400 may also include then using, in real-time, the second outputs of the second model operationally in relation to respective post-transition customers. As used herein, post-transition customers are the customers interacting with the contact center after the transition window has ended.

As used herein, it should be appreciated that when it is stated that a particular output is "used, in real-time, operationally" is intended that the particular output is the one relied on by the system to determine whether or not the automated action is performed in relation to the associated customer. Thus, in accordance with exemplary embodiments, during the pre-transition window, performance of the automated action is dependent solely on the output of the first model. During the transition window, the performance of the automated action is dependent on the output of the second model, but only after it has been transformed via the target probability distribution. And, then, once the transition is complete, performance of the automated action may be dependent solely on the output of the second model (i.e., without the transformation being performed).

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A method for facilitating an operational transition between a first model and a second model in a contact center, wherein the first model and the second model each comprises a predictive model for calculating an output related to a customer interacting with the contact center, the method comprising the steps of:

identifying the first model and the second model, wherein the first model and the second model are machine learning models that are trained based on one or more regression algorithms and empirical data;

defining a transition window, the transition window comprising a predetermined timeframe for operationally transitioning between the first model and the second model;

defining a pre-transition window, the pre-transition window comprising a predetermined timeframe occurring just previous to the transition window;

during the pre-transition window:

using the first model to determine first outputs in relation to respective pre-transition customers, which are ones of the customers interacting with the contact center during the pre-transition window, and, from the first outputs, determining first output probability distributions;

using, in real-time, the first outputs operationally in relation to the pre-transition customers;

during the transition window:

using the second model to determine second outputs in relation to respective transition customers, which are ones of the customers interacting with the contact center during the transition window, and, from the second outputs, determining second output probability distributions;

determining a target output probability distribution;

transforming a current one of the second output probability distributions into the target output probability distribution based on inverse transform sampling that includes determining a cumulative distribution function for a starting distribution and a target distribution and computationally determining an inversion of the target distribution and, based on the transformation, determining a transformed output for each of the second outputs contained in the current one of the second output probability distributions; and compensating for model drift and reducing an impact on resource utilization in the contact center in a performance of automated actions in response to the transformed outputs by using, in real-time, the transformed outputs operationally in relation to the transition customers;

wherein the target output probability distribution comprises a mean output probability distribution derived from:

one or more of the first probability output distributions; and one or more of the second output probability distributions.

2. The method of claim 1, wherein the output indicates a likelihood of a desired outcome occurring in relation to the customer based on behavior data associated with the customer; and wherein the output is scored in relation to a predetermined action threshold for selectively determining whether to perform an automated action in relation to the customer for achieving the desired outcome, the automated action being taken when the output satisfies the action threshold and not taken when the output does not satisfy the action threshold.

3. The method of claim 2, further comprising the steps of:

determining that the predetermined timeframe of the transition period has ended; and using, in real-time, the second outputs of the second model operationally in relation to respective post-transition customers, which are ones of the customers interacting with the contact center after the transition window has ended.

4. The method of claim 2, wherein the first and second model comprise versions of a same machine learning model, with the second model comprising a version of the first model that is retrained by a more current training dataset.

5. The method of claim 2, wherein the mean output probability distribution is weighted so to increasingly emphasize an importance of the one or more second output probability distributions over an importance of the one or more first probability output distributions as the transition window transpires; and wherein the one or more second output probability distributions are each different from the current one of the second output probability distributions.

6. The method of claim 2, wherein the transforming the current one of the second output probability distributions into the target output probability distribution comprises mapping the current one of the second output probability distributions to a target output probability distribution so that a rank of output probabilities is preserved.

7. The method of claim 2, wherein the pre-transition window and the transition window are defined so that each is divided into sequential operating intervals; and wherein:

the first probability output distributions of the first model correspond to respective ones of the operating intervals that make up the pre-transition window; and the second output probability distributions of the second model correspond to respective ones of the operating intervals that make up the transition window.

8. The method of claim 7, wherein, as the transition window transpires, the mean output probability distribution is derived from:

an increasing number of the second probability output distributions; and a decreasing number of the first probability output distributions.

9. The method of claim 8, further comprising the steps of:

determining a lookback period, wherein the lookback period comprises a sliding window of a predetermined number of the operating intervals measured from and occurring just prior to the current one of the operating intervals;

wherein the increasing number of the second probability output distributions and the decreasing number of the first probability output distributions are determined in relation to which of the operating intervals are captured within the lookback period as the lookback period advances in relation to the current one of the operating intervals during the transition window.

10. The method of claim 9, further comprising the steps of:

determining that the predetermined timeframe of the transition window has ended; and using, in real-time, the second outputs of the second model operationally in relation to respective post-transition customers, which are ones of the customers interacting with the contact center after the transition window has ended.

11. The method of claim 9, wherein the first and second model comprise versions of a same machine learning model, with the second model comprising a version of the first model that is retrained by a more current training dataset.

12. The method of claim 9, wherein the transforming the current one of the second output probability distributions into the target output probability distribution comprises mapping the current one of the second output probability distributions to a target output probability distribution so that a rank of output probabilities is preserved.

13. A system for facilitating an operational transition between a first model and a second model in a contact center, wherein the first model and the second model each comprises a predictive model for calculating an output related to a customer interacting with the contact center, the system comprising:

a processor; and a memory, wherein the memory stores instructions that, when executed by the processor, cause the processor to perform the steps of:

identifying the first model and the second model, wherein the first model and the second model are machine learning models that are trained based on one or more regression algorithms and empirical data;

defining a transition window, the transition window comprising a predetermined timeframe for operationally transitioning between the first model and the second model;

defining a pre-transition window, the pre-transition window comprising a predetermined timeframe occurring just previous to the transition window;

during the pre-transition window:

using the first model to determine first outputs in relation to respective pre-transition customers, which are ones of the customers interacting with the contact center during the pre-transition window, and, from the first outputs, determining first output probability distributions;

using, in real-time, the first outputs operationally in relation to the pre-transition customers;

during the transition window:

using the second model to determine second outputs in relation to respective transition customers, which are ones of the customers interacting with the contact center during the transition window, and, from the second outputs, determining second output probability distributions;

determining a target output probability distribution;

transforming a current one of the second output probability distributions into the target output probability distribution based on inverse transform sampling that includes determining a cumulative distribution function for a starting distribution and a target distribution and computationally determining an inversion of the target distribution and, based on the transformation, determining a transformed output for each of the second outputs contained in the current one of the second output probability distributions; and compensating for model drift and reducing an impact on resource utilization in the contact center by in a performance of automated actions in response to the transformed outputs by using, in real-time, the transformed outputs operationally in relation to the transition customers;

wherein the target output probability distribution comprises a mean output probability distribution derived from:

one or more of the first probability output distributions; and one or more of the second output probability distributions.

14. The system of claim 13, wherein the output indicates a likelihood of a desired outcome occurring in relation to the customer based on behavior data associated with the customer; and wherein the output is scored in relation to a predetermined action threshold for selectively determining whether to perform an automated action in relation to the customer for achieving the desired outcome, the automated action being taken when the output satisfies the action threshold and not taken when the output does not satisfy the action threshold.

15. The system of claim 14, wherein the instructions, when executed by the processor, further cause the processor to perform the steps of:

determining that the predetermined timeframe of the transition period has ended; and using, in real-time, the second outputs of the second model operationally in relation to respective post-transition customers, which are ones of the customers interacting with the contact center after the transition window has ended.

16. The system of claim 14, wherein the mean output probability distribution is weighted so to increasingly emphasize an importance of the one or more second output probability distributions over an importance of the one or more first probability output distributions as the transition window transpires; and wherein the one or more second output probability distributions are each different from the current one of the second output probability distributions.

17. The system of claim 14, wherein the transforming the current one of the second output probability distributions into the target output probability distribution comprises mapping the current one of the second output probability distributions to a target output probability distribution so that a rank of output probabilities is preserved.

* * * * *